United States Patent Office 3,272,667
Patented Sept. 13, 1966

3,272,667
SUBMERGED ARC WELDING PROCESS AND FLUX COMPOSITION UTILIZING FLUOROCARBON
John C. Siegle, Hilton, Wilmington, and John Teti, Sr., West Minster, Wilmington, Del., assignors to E. I. du Pont de Nemours and Company, Wilmington, Del., a corporation of Delaware
No Drawing. Filed Dec. 10, 1964, Ser. No. 417,467
6 Claims. (Cl. 148—23)

This is a continuation-in-part of copending application Serial No. 143,090, filed October 5, 1961, now abandoned.

This invention relates to the welding of metals by the submerged arc technique. It is more particularly directed to the use of certain solid fluorocarbon polymers or telomers as a component of flux compositions or in conjunction with flux compositions in submerged arc welding procedures. It is also directed to compositions containing such polymers for use as flux materials in submerged arc welding.

In submerged arc welding processes molten metal is deposited from a bare metal electrode onto a metal workpiece and coalesced with the latter while the entire welding zone, including the melting end of the electrode and the molten deposited metal, is covered by a deep blanket of welding composition or welding medium consisting initially of an unbonded mineral-like material which smothers or blankets the electric arc that otherwise would be visible. The quality of the weld produced, the speed of welding and power consumed depends to a large extent on the composition of the welding medium, known as flux.

According to this invention the process of welding metals by the submerged-arc technique is improved by applying to the surface to be welded a solid particulate fluorocarbon polymer. This fluorocarbon may be mixed with the mineral-like flux or directed to the welding zone by other means, as described below. At the temperature of the molten weld metal the fluorocarbon polymer is decomposed to form gaseous products which beneficially alter the arc characteristics and provide a protective gas blanket about the area of the weld. In addition these products are chemically active species which combine with the oxygen in the weld metal and other impurities in the molten metal, thereby cleaning the molten metal and producing a weld substantially free from deleterious inclusions. Use of the fluorocarbon polymers results in a number of other beneficial effects, which will be described more fully below.

The fluorocarbon substances which can be used according to this invention are polytetrafluoroethylene, polychlorotrifluoroethylene, polyvinylidene fluoride, polyhexafluoropropylene, and the copolymers of vinylidene fluoride and tetrafluoroethylene with hexafluoropropylene. Of these, polytetrafluoroethylene is preferred because of its effectiveness. Mixtures of these polymers can also be used. The degree of polymerization of the polymer is not critical, since the polymer is decomposed at the temperature of the weld metal to provide the active species which are responsible for the beneficial effects of this invention.

It is preferred to use the polymers in conjunction with fluxing materials commonly used in the submerged arc welding process. The flux materials used are solid granular substances usually containing one or more of the oxides of such metals as calcium, potassium, sodium, silicon, aluminum, titanium, magnesium, zirconium and manganese. The oxides may be present as such or as compounds, for example, as silicates, aluminates, and the like. The flux materials may also contain minor amounts of various additives for specific purposes. Halide salts such as calcium fluoride, sodium fluoride and the like may be added to increase the fluidity of the weld metal. A killing agent or deoxidizer such as silico-manganese, ferromanganese or ferrosilicon may be present. Binding agents such as sodium or potassium silicate will ordinarily also be used. Iron oxide may be present as an impurity. Suitable flux compositions are described, for example, in U.S. Patent 2,814,579 and in numerous other U.S. patents, and are readily available commercially.

The most efficient way to apply the polymer to the weld surface is to combine it with the flux. This can be conveniently done by merely mixing the granular flux material with a finely divided particulate halocarbon polymer. The particulate polymer can be obtained by applying the common methods of mechanical subdivision such as grinding to the solid virgin polymer or by other techniques well known in the art, such as coagulating an aqueous colloidal dispersion of the polymer. Re-run and reprocessed scrap polymer meaterial can also be ground and used in the invention. Also, if desired, the polymer can be incorporated into the flux material by coating the flux particles with the polymer or by encapsulating the polymer with the flux, according to procedures known in the art.

In operation the flux composition containing the fluorocarbon polymer is applied to the surface to be welded so as to form a mound along the seam. The electrode is then positioned so that it contacts the material to be welded under a blanket of the flux composition. Both the arc and the weld metal are thus shielded by the flux composition. The flux can be added to the metal surface manually or from a hopper or chute preceding the electrode according to the conventional methods used in the art.

If desired, the fluorocarbon polymer can be added separately, directly to the metal surface. The area to be welded can be dusted with a finely-divided solid fluorocarbon polymer such as can be obtained by grinding a solid virgin halocarbon polymer or it can be covered with a layer of a liquid suspension of the polymer. Suitable dispersions for this purpose are described in co-pending U.S. application of John C. Siegle S.N. 156,515, filed December 1, 1961, now abandoned. The flux material can then be added above the layer of polymer. It is also possible, though not preferred, to use the fluorocarbon polymer without any additional flux material. Other methods of adding the fluorocarbon polymer will be apparent to those skilled in the art.

The amount of fluorocarbon polymer to be incorporated into the flux material is not critical. Generally, the amount will range between 5 and 30% by weight of the total weight of the flux. However, one could operate anywhere within the range of 0.1% to as high as 50%. Of course, one would not operate at concentrations so low that the beneficial effects of the invention would not be obtained or would be marginal. Similarly, there would be no advantage gained in opearting with excessive concentrations and, of course, this would not be desirable from an economic standpoint.

The metals primarily welded by the submerged arc process are ferrous and ferrous alloys, nickel and nickel alloys. Other metals, of course, can be welded by this method and the invention would be applicable to any metal welded by the submerged arc process.

In practicing this invention, numerous advantages have been observed. Incorporation of fluorocarbon polymers into the flux compositions has been found to greatly reduce the harmful effects of the presence of materials such as moisture, dirt, oil, mill scale and rust, which ordinarily produce porosity in welded. Moisture in the flux is of course decomposed at the temperature of the weld melt to form hydrogen and oxygen. These gases can become entrapped in the weld metal, producing porosity in the weld. Since hydrogen and oxygen are effectively "tied up" by the reactive decomposition products of the halocarbon polymers, this effect has been greatly minimized by the practice of this invention. Thus, the invention obviates the necessity of employing a completely dry flux.

The presence of fluorocarbon polymer in the flux compositions has also been found to greatly increase the arc efficiency. Less current is required at a fixed voltage, increased metal deposition occurs and the flux consumption is reduced to less than half. Other advantages which have been observed include easier slag removal, deeper weld penetration and improved bead contour. It is believed that a great deal of the beneficial effect produced by this invention may be attributed to increased metal fluidity, increased arc temperature and improved ionization in the arc plasma.

The invention will be further described by the following illustrative examples:

*Example 1*

A series of welds are made upon a standard carbon steel (SAE 1010) using a conventional, commercially available flux material, alone and in combination with various proportions of a fluorocarbon polymer. In this series, the flux used is Grade 400 Welding Flux, manufactured by Hobart Brothers Company, Troy, Ohio. The nominal composition of this flux is lime, magnesia, and silicate, with some alumina and fluorspar. The fluorocarbon polymer used is a solid finely-divided polytetrafluoroethylene prepared by coagulating an aqueous dispersion of the polymer, and having particles ranging in size from about 300 to 600 microns with an average size of about 500 microns.

In the first test, a weld is made using the conventional flux without added fluorocarbon. In three subsequent tests fluxes are used which contain respectively 10, 15 and 30% by weight of the fluorocarbon polymer. These flux compositions are prepared by merely placing the conventional flux in a tumbler and gradually adding the required amount of solid particulate fluorocarbon polymer. Tumbling is continued until the fluorocarbon polymer particles and flux are thoroughly blended.

The flux compositions are then added by hand to form a mound, along the juncture of the pieces to be welded, of sufficient depth to cover the end of the electrode. The electrode is a 3/32" diameter mild steel welding wire (Hobart HB 18). The electrode wire is drawn from a reel by a feed motor and fed toward the work at a constant speed according to the customary method used in the art. The data recorded from this series of tests are as follows:

| Flux Material | Current, amps. | Travel Speed, i.p.m. | Wire Feed, i.p.m. | Penetration | Slag Removal | Bead Contour |
|---|---|---|---|---|---|---|
| Conventional | 450 | 15 | 132 | Normal | Normal | Normal. |
| 10% Fluorocarbon Addition | 450 | 15 | 240 | Improved | Improved | Improved. |
| 15% Halocarbon Addition | 350 | 15 | 240 | Deep | do | Greatly imprlved. |
| 30% Halocarbon Addition | 350 | 15 | 240 | Much deeper | Greatly improved. | Do. |

When polychlorotrifluoroethylene, or the copolymer of vinylidenefluoride with hexafluoropropylene is substituted for the polytetrafluoroethylene in this example, welds of superior quality and higher metal deposition rates with decreased current requirements also result.

*Example 2*

A solid copolymer of tetrafluoroethylene and hexafluoropropylene in finely divided particulate form is dusted generously over the weld area of 2 pieces of 1" x 6" x 30" AISI 1020 mild steel test plates. Over the polymer layer is placed a layer of Arcos B.D.A. Subarc welding flux so as to form a mound of flux material along the juncture of the two pieces of metal. The pieces are welded by the submerged-arc technique using 1/8" diameter No. 3 "Nickelar" 3½% Ni welding wire produced by the Arcos Corporation. The resulting weld is substantially free from oxidative effects and inclusions.

The invention claimed is:

1. In the process of welding metals by the submerged arc technique, the improvement which comprises employing as a welding medium (1) a granular flux material comprising a member of the group consisting of the oxides of calcium, potassium, sodium, silicon, aluminum, titanium, magnesium, and manganese, and mixtures of said oxides, and (2) a solid fluorocarbon polymer or telomer in finely divided particulate form, the fluorocarbon being selected from the group consisting of polytetrafluoroethylene, polychlorotrifluoroethylene, polyvinylidene fluoride, polyhexafluoropropylene, and the copolymers of vinylidene fluoride and tetrafluoroethylene with hexafluoropropylene, and mixtures of said fluorocarbons.

2. The improvement defined in claim 1 wherein the amount of fluorocarbon is between about 5% and 30% by weight of the welding medium.

3. The improvement defined in claim 1 wherein the fluorocarbon is polytetrafluoroethylene.

4. As a composition for use in submerged arc welding, a granular flux material comprising a member of the group consisting of the oxides of calcium, potassium, sodium, silicon, aluminum, titanium, magnesium, and manganese, and mixtures of said oxides, in admixture with a solid fluorocarbon polymer or telomer in finely divided particulate form, the fluorocarbon being selected from the group consisting of polytetrafluoroethylene, polychlorotrifluoroethylene, polyvinylidene fluoride, polyhexafluoropropylene, and the copolymers of vinylidene fluoride and tetrafluoroethylene with hexafluoropropylene, and mixtures of said fluorocarbons.

5. A composition as defined in claim 4 wherein the amount of fluorocarbon is between about 5% and 30% of the total weight of the composition.

6. A composition as defined in claim 5 wherein the fluorocarbon is polytetrafluoroethylene.

References Cited by the Examiner

UNITED STATES PATENTS

| 2,841,513 | 7/1958 | Morrison | 148—23 |
| 3,078,531 | 2/1963 | Bolkom et al. | 22—215 |
| 3,167,450 | 1/1965 | Koibuchi et al. | 148—26 |

FOREIGN PATENTS

2109/59  4/1959  Japan.

DAVID L. RECK, *Primary Examiner.*

H. F. SAITO, *Assistant Examiner.*